(12) United States Patent
Harsia et al.

(10) Patent No.: US 10,760,596 B2
(45) Date of Patent: Sep. 1, 2020

(54) PROPORTIONAL SEQUENCE VALVE WITH PRESSURE AMPLIFICATION DEVICE

(71) Applicant: Parker-Hannifin Corporation, Cleveland, OH (US)

(72) Inventors: Jarmo Antero Harsia, Palatine, IL (US); Germano Franzoni, Arlington Heights, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 23 days.

(21) Appl. No.: 16/075,558

(22) PCT Filed: Mar. 28, 2017

(86) PCT No.: PCT/US2017/024510
§ 371 (c)(1),
(2) Date: Aug. 3, 2018

(87) PCT Pub. No.: WO2017/172746
PCT Pub. Date: Oct. 5, 2017

(65) Prior Publication Data
US 2019/0032682 A1 Jan. 31, 2019

Related U.S. Application Data

(60) Provisional application No. 62/314,031, filed on Mar. 28, 2016.

(51) Int. Cl.
*F15B 13/04* (2006.01)
*F16K 11/07* (2006.01)
*F15B 13/042* (2006.01)

(52) U.S. Cl.
CPC ........ *F15B 13/0403* (2013.01); *F15B 13/042* (2013.01); *F16K 11/0716* (2013.01);
(Continued)

(58) Field of Classification Search
CPC ....... Y10T 137/8671; Y10T 137/86702; Y10T 137/86582; F16K 11/0716; F16K 11/07;
(Continued)

(56) References Cited

U.S. PATENT DOCUMENTS 2,536,965 A * 1/1951 Taylor ................. F16K 11/0716
137/625.66
4,699,571 A 10/1987 Bartholomaeus
(Continued)

FOREIGN PATENT DOCUMENTS

| CN | 1034 032 619 | 4/2013 |
|---|---|---|
| FR | 53 004 | 9/1945 |
| WO | WO 2012/007739 | 1/2012 |

OTHER PUBLICATIONS

International Search Report and Written Opinion prepared by the European Patent Office in International Application No. PCT/US2017/024510, dated Jun. 30, 2017.
(Continued)

*Primary Examiner* — Kelsey E Cary
(74) *Attorney, Agent, or Firm* — McDonnell Boehnen Hulbert & Berghoff LLP

(57) ABSTRACT

A valve member having a supply pressure and a method of controlling the supply pressure in the valve member includes a valve body having a fluid inlet, a fluid outlet, and a controlled port. The valve member includes a spool moveable within the valve body to fluidly connect at least one of the fluid inlet and the fluid outlet with the controlled port. The spool includes an end in fluid communication with a control pressure port and a pin received within the end of the spool that is moveable relative to the spool. Fluid flow through the control pressure port acts against a cross-sectional area of the pin and an annular area of the spool to modulate the supply pressure through the valve member.

21 Claims, 3 Drawing Sheets

(52) U.S. Cl.
CPC ........... *F15B 2211/3144* (2013.01); *F15B 2211/31576* (2013.01); *F15B 2211/351* (2013.01); *F15B 2211/353* (2013.01)

(58) Field of Classification Search
CPC ........... F15B 13/0403; F15B 13/042; F15B 2211/3144; F15B 2211/31576; F15B 2211/351; F15B 2211/353
See application file for complete search history.

(56) References Cited

U.S. PATENT DOCUMENTS

| | | |
|---|---|---|
| 5,333,645 A | 8/1994 | Galazin |
| 5,577,534 A | 11/1996 | Ward |
| 5,876,185 A | 3/1999 | Schimpf et al. |
| 5,894,860 A | 4/1999 | Baldauf et al. |
| 6,389,809 B1 | 5/2002 | Niidome et al. |
| 9,004,097 B2 | 4/2015 | Crawford et al. |
| 2014/0245732 A1 | 4/2014 | Bauer |

OTHER PUBLICATIONS

Summons to attend Oral Proceedings pursuant to Rule 115(1) EPC, prepared by the European Patent Office in application No. 17 716 378.9 dated Jan. 20, 2020.
First Examination Report prepared by the Indian Patent Office in application No. 201817034751 dated Dec. 27, 2019.
Second Office Action, including an English translation prepared by the Chinese Patent Office in application No. 201780020919.9 dated Jan. 15, 2020.

\* cited by examiner

PROPORTIONAL SEQUENCE VALVE WITH PRESSURE AMPLIFICATION DEVICE

FIELD OF INVENTION

The present invention relates to pressure control systems and in particular to a pressure control valve.

BACKGROUND OF THE INVENTION

Various systems and in particular, hydraulic systems, require pressure control of a fluid flow used in operation of components of the system. Pressure control valves are implemented for a variety of functions such as prohibiting system pressure from exceeding a predetermined pressure limit and maintaining a set pressure in the system.

A conventional type of pressure control valve is a pilot operated relief valve used to control a high pressure or high fluid flow feed to a hydraulic circuit or device, such as a pump. The pilot operated relief valve generally includes an inlet, a piston positioned on a seat of the inlet, a chamber positioned above the piston, a control orifice in communication with the chamber, and a pilot section that contains a spring-loaded poppet and sets a maximum system pressure. A flow path from an outlet of the control orifice on top of the piston leads to the pilot. Fluid used by the pilot section may return to a reservoir. In operation, fluid flows through the inlet to the hydraulic circuit and through the control orifice to the chamber. The fluid also travels to the spring-loaded poppet, where the fluid is blocked. When pressure is too low to unseat the spring-loaded poppet, pressure is the same on both sides of the piston and a spring holds the piston in a normally closed position.

When pressure exceeds the maximum system pressure, the spring-loaded poppet open slightly to allow a small amount of fluid to pass to the reservoir. However, the fluid passing the spring-loaded poppet also flows through the control orifice such that flow to the reservoir may be blocked. As pressure increases, the spring-loaded poppet in the pilot section is opened enough to allow a greater amount of flow than the flow through the control orifice such that pressure in the chamber decreases. When the pressure imbalance exceeds a predetermined value, the piston moves towards the decreased pressure and opens a flow path to the reservoir. When the system pressure decreases, the spring-loaded poppet reseats itself. A disadvantage of the pilot operated relief valve is that they generally operate at a lower maximum pressure and leakage than may occur at the valve seat during high pressure applications.

A direct acting pressure reducing valve may be used as an alternative to using a pilot operated valve in controlling high pressure in a hydraulic system. Direct acting pressure reducing valves respond more rapidly to pressure buildup in comparison with the pilot operated relief valve. The direct acting pressure reducing valve is generally controlled with a solenoid. However, a disadvantage of the direct acting pressure reducing valve is that in a high-pressure application, requirements for the solenoid may demand a solenoid that is disadvantageously large in size.

SUMMARY OF THE INVENTION

The present application is directed towards providing a proportional sequence valve for controlling high pressure between a fluid supply and a hydraulic actuating device. The valve uses a spool and a pin that is positioned within a body of the spool and moveable relative to the spool. Providing the pin effectively allows for two independent control pressures to act against an end of the spool, by way of high pressure acting an annular surface of the spool and a cross-sectional area of the pin. The relationship between the pin and the spool creates an amplification factor that is used to modulate the pressure in the valve. The diameter of the pin may be selected to increase or decrease the amplification factor, depending on the particular application in which the valve is to be implemented.

According to an aspect of the invention, a valve member for supplying and discharging fluid flow includes a valve body having a fluid passage, a spool moveable within the valve body, the spool having a first end, a second end opposite the first end, and a bore defined at the second end, wherein the second end is in fluid communication with the fluid passage, and a pin that is received within the bore of the spool and moveable relative to the spool, the pin and the spool being concentric and moveable along a common axis. A fluid flow through the fluid passage acts against a cross-sectional area of the pin and an annular area of the spool at the second end of the spool.

According to another aspect of the invention, a valve member for operating a hydraulic actuating device includes a valve body defining a supply port, a tank port, and a controlled port fluidly connectable between the hydraulic actuating device and at least one of the supply port and the tank port, a pressure control port, a slideable spool for fluidly connecting the controlled port with at least one of the supply port and the tank port, wherein the slideable spool has a first end, a second end, and a bore chamber extending between the first and second end, and a pin that is received within the bore chamber at the second end of the spool and slideable relative to the spool. The spool moves in a first direction in response to a biasing force that acts on a cross-sectional area of the spool at the first end of the spool within the valve body. The spool moves in a second direction opposite the first direction in response to pressure from the pressure control port that acts on an annular area of the spool and on a cross-sectional area of the pin at the second end of the spool.

According to another aspect of the invention, a method of controlling a supply pressure may be used in a valve member having a fluid inlet, fluid outlet, and a controlled port. The method includes positioning a spool within the valve member, the spool having a first end and a second end opposite the first end, positioning a pin within the spool at the second end of the spool, applying a control pressure against an annular area of the spool and a cross-sectional area of the pin at the second end of the spool, moving the spool for fluidly connecting and disconnecting at least one of the fluid inlet and the fluid outlet with the controlled port, and moving the pin relative to the spool to modulate the supply pressure in the valve member.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
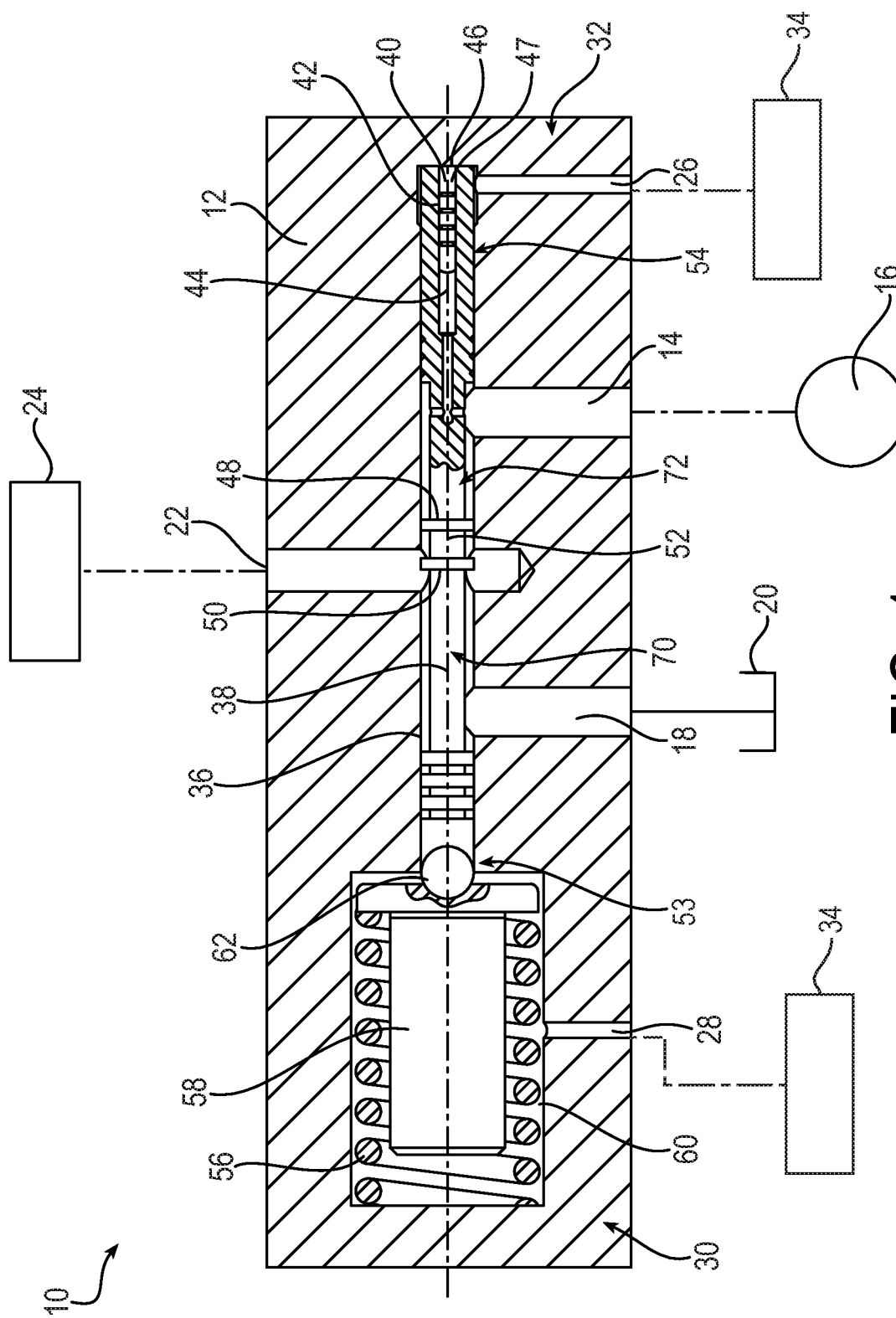
FIG. 1 is a drawing depicting a sectional view of a valve member according to an exemplary embodiment of the present application showing a controlled port, a tank port, a supply port, two control ports, a spool valve, and a pin.

The principles of the present application have particular application in a pressure control valve having a supply pressure for operation of an associated device or system, such as a hydraulic system. Other applications may include any suitable application that currently implements pressure relief valves, pressure reducing valves, unloading valves, sequence valves, counterbalance valves, or other suitable valves for pressure control. The valve member according to the present application includes a pin slideable within a bore of a spool of the valve member, allowing a control pressure to act on both an area of the pin and an area of the spool, at the end of the spool where the pin is positioned. Using the pin is advantageous over conventional pressure control valves in that allowing high pressure to act on the area of the pin and the spool allows the supply pressure to be more efficiently controlled through modulation of the pin and the spool.

Embodiments of the present invention will now be described with reference to the drawings, wherein like reference numerals are used to refer to like elements throughout. It will be understood that the figures are not necessarily to scale.

Referring to FIG. 1, a valve member 10 includes a valve body 12. The valve body 12 may include a first main port or a supply port 14. The supply port 14 may be fluidly connected to a source 16 of hydraulic pressure, such as a pump or an accumulator. The valve member 10 may include a second main port or a tank port 18. The tank port 18 may be connected to a hydraulic reservoir or tank 20 that is maintained at a null pressure value. The valve member 10 may further include a controlled port 22 that is connected to a hydraulic actuating device 24. The controlled port 22 may be connected to any suitable hydraulic actuating device, such as a cylinder or a motor. The controlled port 22 may be in fluid communication with at least one of the supply port 14 and the tank port 18. An amount of fluid flow may be supplied to the valve body 12 from the supply port 14 and discharged through the second main port 18 or the controlled port 22 for operating the hydraulic actuating device 24. Continuous flow into the supply port 14, into and out of the controlled port 22, and out of the tank port 18 may occur such that flow through the valve member 10 is continuous.

The valve member 10 may include at least one control port 26, 28 defined by the valve body 12. The valve member 10 may include a first control port 26 and a second control port 28 that are positioned distally opposite one another at a first end 30 of the valve body 12 and at a second end 32 of the valve body 12. Each of the control ports 26, 28 may define a smaller cross-section flow area relative to the supply port 14, tank port 18, and controlled port 22. Each of the control ports 26, 28 may be in fluid communication with a pressure control device 34, such as a relief valve or reducing valve. The control ports 26, 28 may be used to transmit a signal pressure from the pressure control device 34 to the valve member 10. It should be recognized that the control ports 26, 28 are optional components of the valve body 12 and are configured to provide pressure control for the valve member 10 and the hydraulic circuit in which the valve member 10 may be implemented.

The valve body 12 defines an internal cylindrical bore 36 that is configured to receive a spool 38. The cylindrical bore 36 may have a predetermined and close tolerance radial clearance that is configured to allow longitudinal movement of the spool 38 within the cylindrical bore 36. The valve body 12 includes a pin 40 that is located within a bore 42 of the spool 38 and positioned along a longitudinal axis of the bore 42. The pin 40 and the spool 38 may be concentric along the longitudinal axis, and the spool 38 may circumscribe the pin 40. The pin 40 may be a push pin or a plunger. The pin 40 is slideable within the bore 42 relative to the spool 38. The stroke of the pin 40 is limited at a first end 44 of the bore 42 and at a second end 46 of the bore 42 by the valve body 12. The stroke of the pin 40 may be limited by a stop member formed at the first end 44 within the bore 42 that is drilled inside the spool 38. The pin 40 and the second end 46 of the bore 42 of the spool 38 may define a chamber 47 that is in fluid communication with the control port 26 located at the second end 32 of the valve body 12.

The spool 38 may include at least one metering land. In the example of FIG. 1, the spool 38 may include a first metering land 48 and a second metering land 50 that are spaced apart along the spool 38. The first metering land 48 and the second metering land 50 define an area opening 52 therebetween. The area opening 52 may be fixed and moveable within the valve body 12 for fluidly connecting and disconnecting the controlled port 22 with at least one of the supply port 14 and the tank port 18. The valve body 12 may define a longitudinal axis along which the spool 38 may oscillate between a first direction and a second direction opposite the first direction, such that the area opening 52 oscillates with the spool 38.

The spool 38 may be configured to have at least two positions within the valve body 12. The first position, shown in FIG. 1, is the biased or normal position of the spool 38. The first position is defined by the tank port 18 being fluidly connected to the controlled port 22 via the second metering land 50, and the first metering land 48 is positioned such that the spool blocks the supply port 14 from fluid communication with the controlled port 22. In the first position, fluid flow may be discharged through the tank port 18. The second position of the spool 38 is defined by the supply port 14 being fluidly connected to the controlled port 22 via the first metering land 48, and the second metering land 50 being positioned such that the spool blocks fluid communication between the tank port 18 and the controlled port 22. In the second position, fluid flow may be supplied through the supply port 14. The spool 38 may also be configured to have a third position that is between the first position and the second position. The third position of the spool 38 may be defined at any location along the path of travel of the spool between the first position and the second position. The third position of the spool 38 may be defined by the first metering land 48 being positioned such that the spool 38 blocks the supply port 14 from being fluidly connected to the controlled port 22, and the second metering land 50 being positioned such that the spool also blocks the tank port 18 from being fluidly connected to the controlled port 22. In an alternative configuration of the spool 38, the third position may be defined by the first metering land 48 being positioned to allow the supply port 14 to be fluidly connected to the controlled port 22, and the second metering land 50 being positioned also to allow the tank port 18 to be fluidly connected to the controlled port 22.

The spool has a first end 53 and a second end 54 opposite the first end 53. The pin 40 is positioned within the bore 42 of the spool 38 at the second end 54 of the spool 38. The first end 53 may be in contact with a biasing member 56 through a guide member 58, and the biasing member may be a spring 56. The guide member 58 and the spring 56 may be positioned within a chamber 60 located along the longitudinal axis of the valve body 12. A portion of the first end 53 of the spool 38 may be engageable with the guide member 58 through an opening 62 of the chamber 60 such that the spring 56 and the guide member 58 may move the spool 38 along the longitudinal axis. The chamber 60 may be in fluid communication with the control port 28.

Figure 2:
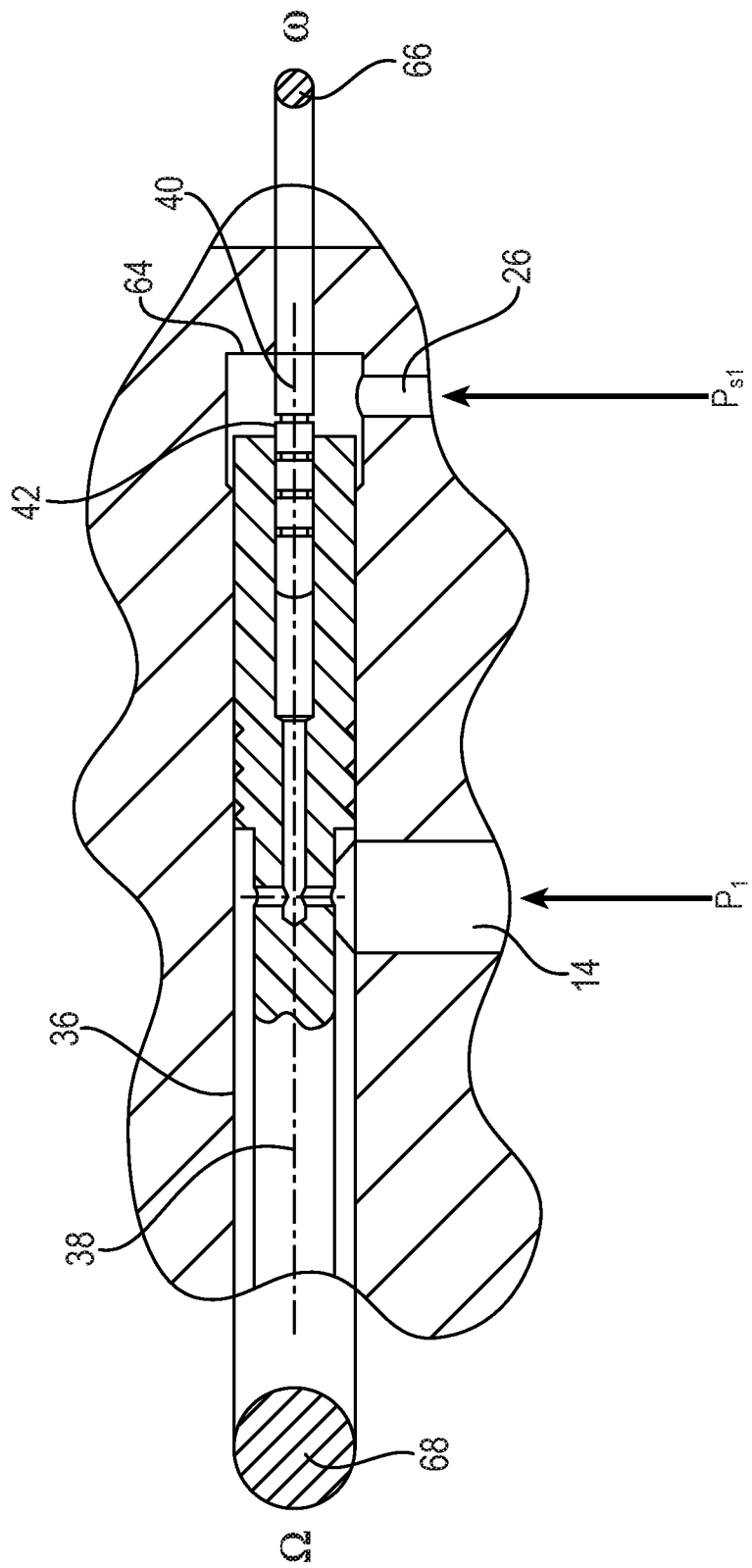
FIG. 2 is a drawing depicting a detailed sectional view of the valve member of FIG. 1 showing the spool and the pin in detail.

A method of controlling a supply pressure in the valve member 10 may be provided. The valve member 10 includes a fluid inlet, or the supply port 14, a fluid outlet, or the tank port 18, and the controlled port 22. The method includes positioning the spool 38 within the valve member 10 and positioning the pin 40 within the spool 38 at the second end 54 of the spool 38. Referring in addition to FIG. 2, the method further includes applying a control pressure against an annular area 64 of the spool 38 and a cross-sectional area 66 (ω) of the pin 40 to move the spool 38 towards the second position of the spool 38. The method also includes moving the spool 38 for fluidly connecting and disconnecting at least one of the fluid inlet 14 and the fluid outlet 18 with the controlled port 22, and moving the pin 40 relative to the spool 38 to modulate the supply pressure in the valve member 10. The spool 38 is moveable within the bore 36 to control fluid pressure through the valve body 12 to the controlled port 22 and the hydraulic actuating device 24.

The spool 38 is also moveable along the longitudinal axis in a first direction, or a negative direction, towards the first position of the spool 38, where the tank port 18 is fluidly connected to the controlled port 22. The spool 38 is moveable in a second direction that is opposite the first direction, or a positive direction, towards the second position of the spool 38 where the supply port 14 is fluidly connected to the controlled port 22. The position of the spool 38 is dependent on the fluid pressure acting on the spool 38, or the forces acting on the spool 38. The forces acting on the spool 38 in the positive direction, F+, include fluid pressure, or main supply pressure $p_1$, within the chamber 47 defined by the pin 40 and the second end 46 of the spool bore 42 such that the supply pressure $p_1$ acts on an effective area of the spool 38 comprising interior surfaces of the spool 38 bounding the spool bore 42, the effective are being equal to the cross-sectional area 66 (ω) of the pin 40, and fluid pressure $p_{s1}$ from the first control port 26 acting on the second end 54 of the spool 38. Referring to FIG. 2, the fluid pressure $p_{s1}$ acts on the annular area 64 of the spool 38 and on the cross-sectional area 66 (ω) of the pin 40 at the second end 54 of the spool 38. The annular area 64 of the spool 38 against which the fluid pressure acts is equal to a cross-sectional area 68 (Ω) of the spool 38 minus the cross-sectional area 66 of the pin 40. Effectively, providing the pin 40 allows two independent pressures to act on the second end 54 of the spool 38.

The method of controlling the supply pressure may further include biasing the spool 38 in the negative direction and moving the spool 38 in the positive direction in response to the control pressure. The forces acting on the spool 38 in the negative direction, F−, include a force of the spring 56 acting on the spool 38 at the first end 53 of the spool 38. The force of the spring 56 acting on the spool 38 is equal to $F_0$-kx, where $F_0$ is a pre-loaded force of the spring 56 and kx is the force needed to compress the spring by a distance x, k being a spring constant. The method may further include applying a second control pressure, or fluid pressure $p_{s2}$, against the cross-sectional area 68 (Ω) of the spool at the first end 53 of the spool 38 and moving the spool 36 in the negative direction in response to the second control pressure. The total forces acting on the spool 38 may be represented by equation (1) which represents the forces acting on the spool 38 in the positive direction, and equation (2) which represents the forces acting on the spool 38 in the negative direction.

$$F+=p1\cdot\omega+ps1\cdot\Omega \qquad (1)$$

$$F-=ps2\cdot\Omega+F0-kx \qquad (2)$$

Moving the spool 38 in the negative direction may further include moving the spool 38 towards the first position of the spool 38 and discharging fluid pressure from the controlled port 22. If the forces acting in the negative direction, F−, are greater than the forces acting in the positive direction, F+, the spool 38 will be held at an end of its stroke against the valve body 12, in the first position where the first metering land 48 is positioned such that the spool 38 blocks fluid communication between the controlled port 22 and the supply port 14, and the second metering land 50 allows fluid communication between the controlled port 22 and the tank port 18.

Moving the spool 38 in the positive direction may further include moving the spool 38 towards the second position of the spool 38 and supplying fluid pressure to the controlled port 22. When at least one of the main supply pressure $p_1$ within the chamber 47 is increased, fluid pressure $p_{s1}$ from the first control port 26 is increased, or the fluid pressure $p_{s2}$ at the second control pressure port 28 is decreased, the spool 38 will start to move in the positive direction towards the second position of the spool 38. The second position of the spool 38 is defined by the supply port 14 being fluidly connected to the controlled port 22. The equilibrium position x of the spool 38, or the position of the spool as a function of the different pressure in the valve member 10 will be represented by equation (3).

$$x = \frac{(ps2 - ps1)\cdot\Omega - p1\cdot\omega + F0}{k} \qquad (3)$$

While an increase in the main supply pressure $p_1$ or in the fluid pressure $p_{s1}$ from the first control port 26 shifts the spool 38 in the positive direction, an increase in the fluid pressure $p_{s2}$ generated at the second control pressure port 28 located at the opposite end of the valve body 12 shifts the spool 38 in the negative direction.

In addition to moving the spool 38 in the negative and positive direction towards the first and second position of the spool 38, respectively, the method of controlling the supply pressure may still further include holding the spool 38 in a third position between the first position and the second position. The third position may be defined by the fluid inlet 14 and the fluid outlet 18 both being fluidly connected to the controlled port 22, or the supply port 14 and the tank port 18 both being blocked from fluid connection with the controlled port 22.

Figure 4:
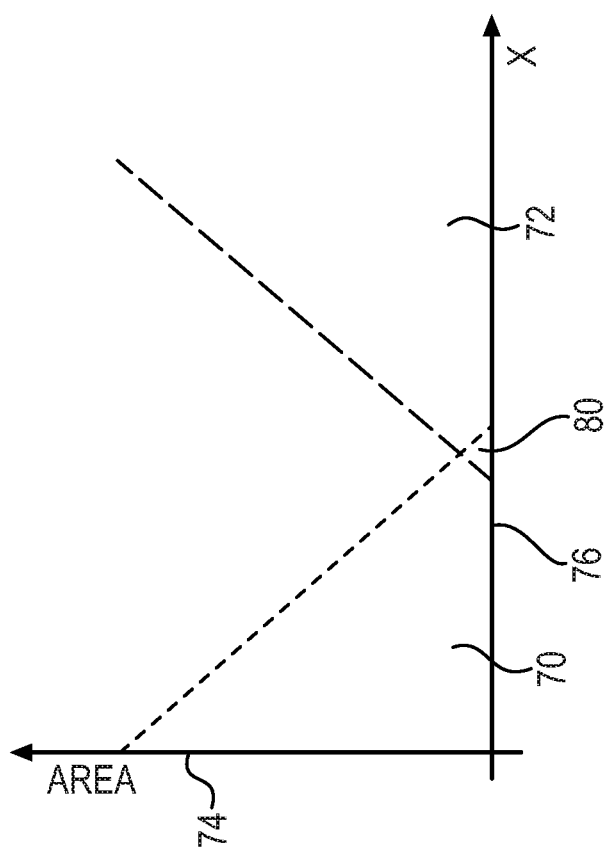
FIG. 4 is a drawing depicting a chart of the operation of the valve member according to another exemplary embodiment of the present application, showing an opening area between the controlled port and the tank port and an opening area between the controlled port and the supply port controlled by a position of the spool, where both of the opening areas are simultaneously open during a portion of the spool travel.
Figure 3:
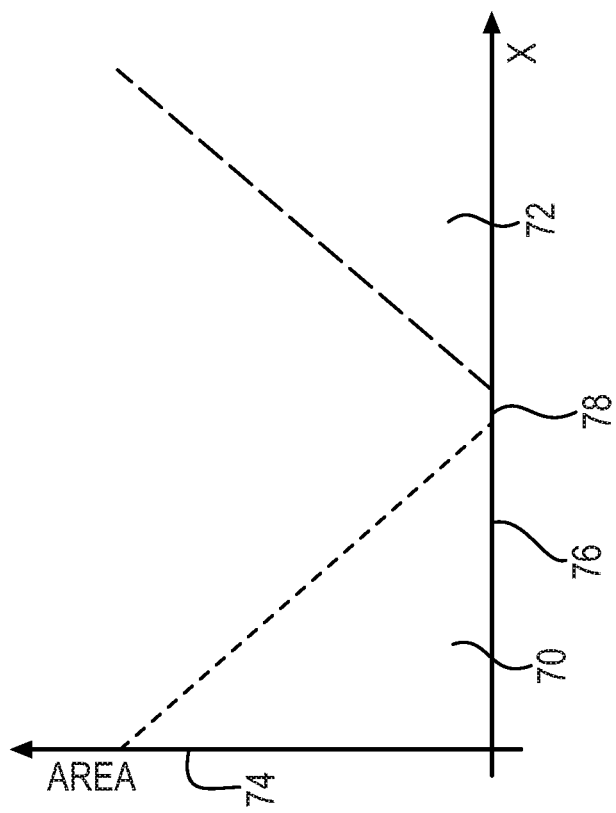
FIG. 3 is a drawing depicting a chart of the operation of the valve member according to an exemplary embodiment of the present application, showing an opening area between the controlled port and the tank port and an opening area between the controlled port and the supply port controlled by a position of the spool, where both of the opening areas are closed during a portion of the spool travel.

The spool 38 includes an opening area 70 between the controlled port 22 and the tank port 18, and an opening area 72 between the controlled port 22 and the supply port 14. FIGS. 3 and 4 illustrate graphs showing the relationship between the opening areas 70, 72, along the y-axis 74, as the spool moves to different positions x from the negative direction to the positive direction, or to the right along the x-axis 76. As shown in FIGS. 3 and 4, as the spool 38 moves in the positive direction, the opening area 70 decreases and the opening area 72 increases. When the spool 38 moves in the negative direction, the opening area 70 increases and the opening area 72 decreases. As also indicated by FIGS. 3 and 4, flow may be controlled at every position x of the spool 36.

As shown in FIG. 3, in one exemplary embodiment the spool 38 may be configured such that during a portion of travel 78 of the spool 36, both opening areas 70 and 72 are closed. When both opening areas 70, 72 are closed, the first metering land 48 is positioned such that the spool blocks fluid communication between the controlled port 22 and the supply port 14, and the second metering land 50 is positioned such that the spool blocks fluid communication between the controlled port 22 and the tank port 18. As shown in FIG. 4, in an alternative exemplary embodiment the spool 38 may be configured such that during a portion of travel 80, both opening areas 70 and 72 are at least partially open. When both opening areas 70, 72 are at least partially open, the first metering land 48 may allow fluid communication between the controlled port 22 and the supply port 14 and the second metering land 50 may allow fluid communication between the controlled port 22 and the tank port 18. For the given position x of the spool 38, the main supply pressure $p_1$ may be represented by equation (4), as a function of the pressure at the control ports 26, 28.

$$p1 = (ps2 - ps1)\frac{\Omega}{\omega} + \frac{F0 - kx}{\omega} \quad (4)$$

Equation (4) includes an amplification factor $$\frac{\Omega}{\omega}$$

constituting a ratio of the cross-sectional areas 68 of the spool 38 and 66 of the pin 40. The main supply pressure $p_1$ may be modulated by either of the fluid pressure $p_{s1}$ at the first control port 26 or $p_{s2}$ at the second control port 28. The change between the fluid pressures will be multiplied by the amplification factor $$\frac{\Omega}{\omega}.$$

For example if the amplification factor is ten, a change of pressure of ten bar, or 1000 kilopascals, between the fluid pressure $p_{s1}$ at the first control port 26 and the fluid pressure $p_{s2}$ at the second control port 28 will determine a change of 100 bar in the setting pressure of the valve member 10.

In one exemplary embodiment, the valve member 12 may be configured such that the first control port 26 is always connected to the tank port 18 such that the fluid pressure $p_{s1}$ at the first control port 26 will be zero at any given time, and equation (4) becomes equation (5).

$$p1 = (ps2)\frac{\Omega}{\omega} + \frac{F0 - kx}{\omega} \quad (5)$$

The fluid pressure $p_{s2}$ at the second control port 28 and the main supply pressure $p_1$ are directly proportional. An increase in the fluid pressure $p_{s2}$ at the second control port 28 will thus determine an increase in the main supply pressure $p_1$ by the amplification factor $$\frac{\Omega}{\omega}.$$

In still another example, the valve member 12 may be configured such that the second control port 28 is always connected to the tank port 18. The fluid pressure $p_{s2}$ at the second control port 28 will be zero at any given time, and equation (4) becomes equation (6).

$$p1 = (-ps1)\frac{\Omega}{\omega} + \frac{F0 - kx}{\omega} \quad (6)$$

The relationship between the fluid pressure $p_{s1}$ at the first control port 26 and the main supply pressure $p_1$ is indirectly proportional such that an increase in the fluid pressure $p_{s1}$ at the first control port 26 will decrease the value of the main supply pressure $p_1$ by the amplification factor $$\frac{\Omega}{\omega}.$$

A diameter of the pin 40 may be selected or changed in accordance with a particular application, to accordingly control the cross-sectional area ω of the pin and the amplification factor $$\frac{\Omega}{\omega}.$$

For example, me pin may nave a diameter between 2 mm and 15 mm and the spool may have a diameter between 6 mm and 20 mm, such that the amplification factor may have a value between 1 and 10. The diameter of the pin has an inversely proportional relationship to the amplification factor, such that increasing the diameter will decrease the amplification factor. For example, in an application where a low pressure supply to the actuating device is desired, the pin diameter may be selected to be half the length of the spool diameter, such that the amplification factor is two. In another application where a greater pressure supply is desired, the pin diameter may be selected to be ten times smaller than the diameter of the spool, such that the amplification factor is ten.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve member for supplying and discharging fluid flow, the valve member comprising:
a valve body having a fluid passage, a supply port for supplying a flow of fluid to the valve member, a tank port for discharging the flow of fluid from the valve member, and a controlled port for supplying fluid to a hydraulic device;
a spool moveable within the valve body, the spool having a first end, a second end opposite the first end, and a bore defined at the second end, wherein the second end is in fluid communication with the fluid passage; and
a pin that is received within the bore of the spool and moveable relative to the spool, the pin and the spool being concentric and moveable along a common axis,
wherein a fluid flow through the fluid passage acts against a cross-sectional area of the pin and an annular area of the spool at the second end of the spool to move the spool between: (i) a first position where the tank port is fluidly connected to the controlled port, (ii) a second position where the supply port is fluidly connected to the controlled port, and (iii) a third position where both the supply port and the tank port are fluidly connected to the controlled port.

2. The valve member of claim 1, wherein the bore includes a first end defining a stop member and a second end opposite the first end, the first end being disposed at a position within the spool and the second end being located at the second end of the spool, wherein a stroke of the pin is limited by the stop member at the first end of the bore and by the valve body at the second end of the bore.

3. The valve member of claim 1, wherein the third position that is defined at a location between the first position and second position.

4. The valve member of claim 3, wherein the spool includes a first and second metering land for fluidly connecting and disconnecting the controlled port with at least one of the supply port and the tank port.

5. The valve member of claim 4, wherein the first metering land is positioned to allow the supply port to be fluidly connected to the controlled port when the spool is in the second position, and the second metering land is positioned to allow the tank port to be fluidly connected to the controlled port when the spool is in the first position.

6. The valve member of claim 4, wherein the third position is defined by the first metering land being positioned to allow the supply port to be fluidly connected to the controlled port and the second metering land being positioned to allow the tank port to be fluidly connected to the controlled port.

7. The valve member of claim 3, further comprising: a biasing spring engageable with the spool for biasing the spool towards the first position.

8. The valve member of claim 7, wherein the valve body defines a spring chamber in which the biasing spring is moveable.

9. The valve member of claim 8, wherein the valve body includes a first control port in fluid communication with the second end of the spool, and a second control port in fluid communication with the spring chamber.

10. A valve member for operating a hydraulic actuating device, the valve member comprising:
a valve body defining a supply port, a tank port, and a controlled port fluidly connectable between the hydraulic actuating device and at least one of the supply port and the tank port;
a pressure control port;
a spool that is slideable and fluidly connecting the controlled port with at least one of the supply port and the tank port, wherein the spool has a first end, a second end, and a bore chamber extending between the first and second end; and
a pin that is received within the bore chamber at the second end of the spool and is slideable relative to the spool,
wherein the spool is biased in a first direction by a biasing force that acts on a cross-sectional area of the spool at the first end of the spool, and
wherein the spool moves in a second direction opposite the first direction within the valve body in response to pressure from the pressure control port acting on an annular area of the spool and acting on a cross-sectional area of the pin at the second end of the spool, wherein the spool is moveable between (i) a first position where the tank port is fluidly connected to the controlled port, (ii) a second position where the supply port is fluidly connected to the controlled port, and (iii) a third position where both the supply port and the tank port are fluidly connected to the controlled port.

11. The valve member of claim 10, wherein the spool moves in the first direction towards the first position, and wherein the spool moves in the second direction towards the second position.

12. The valve member of claim 11, wherein the spool includes a first and second metering land for fluidly connecting and disconnecting the controlled port with at least one of the supply port and the tank port.

13. The valve member of claim 12, wherein the first metering land is positioned to allow the supply port to be fluidly connected to the controlled port when the spool is in the second position, and the second metering land is positioned to allow the tank port to be fluidly connected to the controlled port when the spool is in the first position.

14. The valve member of claim 12, wherein the third position is defined by the first metering land being positioned to allow the supply port to be fluidly connected to the controlled port and the second metering land being positioned to allow the tank port to be fluidly connected to the controlled port.

15. A method of controlling a supply pressure in a valve member having a fluid inlet, fluid outlet, and a controlled port, the method comprising:
- positioning a spool within the valve member, the spool having a first end and a second end opposite the first end;
- positioning a pin within the spool at the second end of the spool;
- applying a force by a spring on the first end of the spool;
- applying the supply pressure to an effective area of the spool equal to a cross-sectional area of the pin;
- applying a control pressure against: (i) an annular area of the spool, wherein the annular area of the spool comprises a cross-sectional area of the spool minus the cross-sectional area of the pin, and (ii) the cross-sectional area of the pin at the second end of the spool;
- moving the spool for fluidly connecting and disconnecting at least one of the fluid inlet and the fluid outlet with the controlled port;
- moving the pin relative to the spool to modulate the supply pressure in the valve member; and
- changing the supply pressure based on: (i) amplification of the control pressure by a ratio between the cross-sectional area of the spool and the cross-sectional area of the pin, and (ii) a ratio between the force of the spring and the cross-sectional area of the pin.

16. The method of claim 15, further comprising:
biasing the spool in a first direction; and
moving the spool in a second direction opposite the first direction in response to the control pressure.

17. The method of claim 16, further comprising:
- applying a second control pressure against the cross-sectional area of the spool at the first end of the spool; and
- moving the spool in the first direction in response to the second control pressure.

18. The method of claim 17, wherein moving the spool in the first direction further comprises:
- moving the spool towards a first position, wherein the first position is defined by the fluid outlet being fluidly connected to the controlled port; and
- discharging fluid pressure from the controlled port.

19. The method of claim 18, wherein moving the spool in the second direction further comprises:
- moving the spool towards a second position, wherein the second position is defined by the fluid inlet being fluidly connected to the controlled port; and
- supplying fluid pressure to the controlled port.

20. The method of claim 19, further comprising holding the spool in a third position between the first position and the second position, wherein the third position is defined by the fluid inlet and the fluid outlet being fluidly connected to the controlled port.

21. The method of claim 19, further comprising holding the spool in a third position between the first position and the second position, wherein the third position is defined by the fluid inlet and the fluid outlet being blocked from fluid connection with the controlled port.

* * * * *